United States Patent
Post

(10) Patent No.: US 6,396,186 B1
(45) Date of Patent: May 28, 2002

(54) ELECTROMECHANICAL BATTERY DESIGN SUITABLE FOR BACK-UP POWER APPLICATIONS

(75) Inventor: Richard F. Post, Walnut Creek, CA (US)

(73) Assignee: The Regents of the University of California, Oakland, CA (US)

( * ) Notice: Subject to any disclaimer, the term of this patent is extended or adjusted under 35 U.S.C. 154(b) by 778 days.

(21) Appl. No.: 08/758,513

(22) Filed: Dec. 2, 1996

(51) Int. Cl.[7] .............................. H02K 3/04; H02K 1/06
(52) U.S. Cl. ...................... 310/198; 310/67 R; 310/74; 310/156.43; 310/179
(58) Field of Search ................................ 310/67 R, 74, 310/198, 113; 322/4, 46

(56) References Cited

U.S. PATENT DOCUMENTS

| | | | |
|---|---|---|---|
| 3,590,353 A | | 6/1971 | Kobayashi et al. .......... 310/156 |
| 3,683,216 A | * | 8/1972 | Post .............................. 310/74 |
| 3,931,535 A | * | 1/1976 | Roesel, Jr. .................. 310/113 |
| 4,567,407 A | * | 1/1986 | Ecklin ......................... 310/113 |
| 4,680,514 A | * | 7/1987 | Sudler ......................... 318/318 |
| 4,782,259 A | * | 11/1988 | Shikama et al. ............. 310/113 |
| 4,843,292 A | | 6/1989 | Ono et al. ................... 318/606 |
| 4,990,808 A | * | 2/1991 | Paulsen ....................... 310/113 |
| 5,349,258 A | | 9/1994 | Leupold et al. ............. 310/154 |
| 5,398,571 A | * | 3/1995 | Lewis ......................... 310/90.5 |
| 5,661,354 A | * | 8/1997 | Burtis ......................... 310/113 |
| 5,705,902 A | * | 1/1998 | Merritt et al. .............. 310/156 |

* cited by examiner

*Primary Examiner*—Karl Tamai
(74) *Attorney, Agent, or Firm*—John P. Woolridge; Alan H. Thompson

(57) ABSTRACT

The windings that couple energy into and out of the rotor of an electro-mechanical battery are modified. The normal stator windings of the generator/motor have been replaced by two orthogonal sets of windings. Because of their orthogonality, they are decoupled from each other electrically, though each can receive (or deliver) power flows from the rotating field produced by the array of permanent magnets. Due to the orthogonal design of the stator windings and the high mechanical inertia of the flywheel rotor, the resulting power delivered to the computer system is completely insensitive to any and all electrical transients and variabilities of the power from the main power source. This insensitivity includes complete failure for a period determined only by the amount of stored kinetic energy in the E-M battery modules that are supplied. Furthermore there is no need whatsoever for fast-acting, fractional-cycle switches, such as are employed in conventional systems, and which are complicated to implement.

9 Claims, 2 Drawing Sheets

ELECTROMECHANICAL BATTERY DESIGN SUITABLE FOR BACK-UP POWER APPLICATIONS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the electromechanical battery, and more specifically, it relates to an improvement in the windings that couple energy into and out of the rotor of an electromechanical battery where the improvement provides power in the event of a utility main power failure.

2. Description of Related Art

A critical problem for many sensitive electronic devices, including modern computer systems, is to protect them against irregularities in the power delivered to them from utility mains. This problem has two aspects. The first problem is upward voltage transients that can upset the electronics systems, e.g., in a computer. The second, and more serious one, is when the supply line voltage drops below normal, or even fails completely for some extended period. While the first problem can be addressed, at least partially, through surge-suppressors, the second one requires a viable degree of isolation from power "brown outs." Outright failures can only be addressed by providing a very sophisticated system that eliminates even fractional-cycle drops in providing power to currently used complicated electronic systems, even including systems using superconductor magnet energy storage and complicated electronic switching techniques.

SUMMARY OF THE INVENTION

It is an object of the present invention to provide an improvement to an electric machine such as the electromechanical battery, where the improvement provides both complete isolation from upward voltage surges and transientless power in the event of a utility main power failure.

It is another object of the present invention to replace the normal stator windings of the generator/motor of an electromechanical battery with two orthogonal sets of windings where each set of windings is decoupled from each other electrically.

The invention is an improvement to the electromechanical (E-M) battery. In the E-M battery design that employs a fiber composite rotor, the inner surface carries an array of permanent magnets. The rotating field from this array then couples inductively to windings located inside the array.

In the present invention, a modification is made to the windings that couple energy into and out of the rotor. The normal stator windings of the generator/motor have been replaced by two orthogonal sets of windings. Because of their orthogonality, they are decoupled from each other electrically, though each can receive (or deliver) power flows from the rotating field produced by the array of permanent magnets.

Power is delivered to a frequency converter that converts the utility mains frequency to a variable frequency voltage synchronized to the rotation speed of the flywheel of the electromechanical battery. When the system is first activated the frequency converter circuitry will energize one set of two orthogonal windings to bring the flywheel system up to its normal operating speed, at which point it will store enough kinetic energy to operate a computer system during power failure. The second set of windings then will be coupled to another frequency converter system using rectifiers and an inverter to convert power to the ac frequency needed by the computer system. For redundancy, another E-M battery may be connected to the frequency converter, so that failure of either E-M module, or its disconnection for maintenance, would not result in power interruption.

DETAILED DESCRIPTION OF THE INVENTION

The invention is an improvement to the electromechanical (E-M) battery. In the E-M battery design that employs a fiber composite rotor, the inner surface carries an array of permanent magnets in a so-called Halbach Array, a particularly efficient way to design an iron-less generator/motor. Embodiments of the Halbach Array DC Motor/Generator are described in U.S. Pat. No. 5,705,902 filed Feb. 3, 1995, which is incorporated herein by reference. The rotating field from this array then couples inductively to windings located inside the array.

Figure 1A:
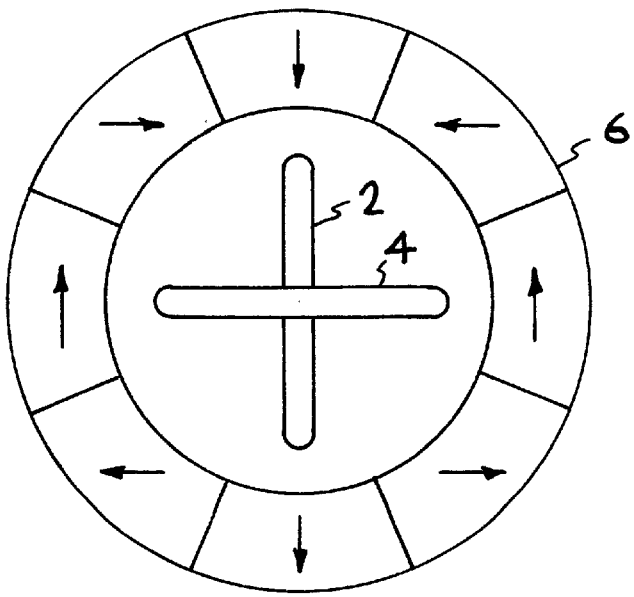
FIG. 1A shows a rotating Halbach Array with stationary orthogonal windings.
Figure 1B:
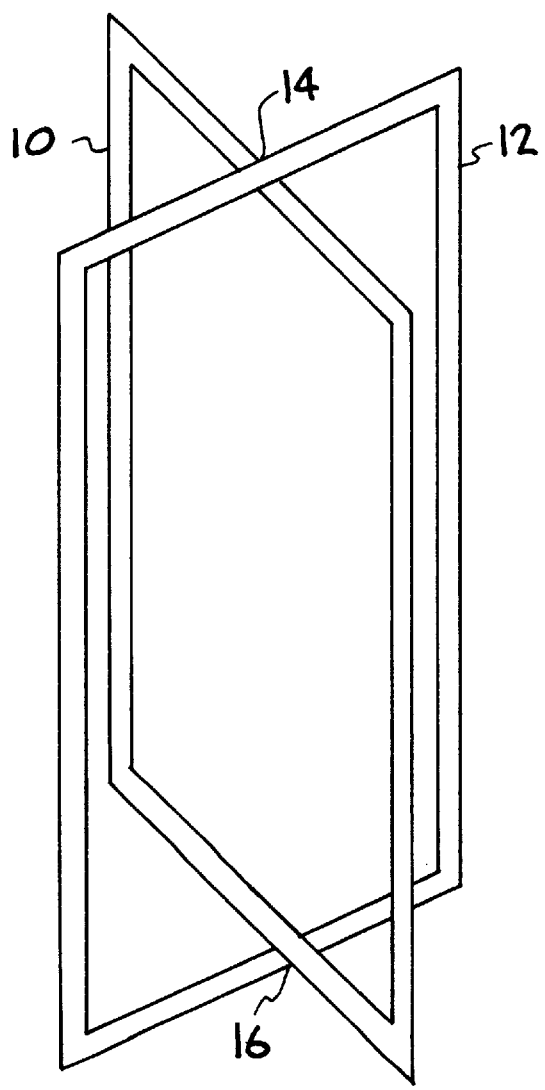
FIG. 1B is a schematic of orthogonal stator windings.

The invention pertains mainly to a modification in the design of the windings that couple energy into and out of the rotor. FIG. 1 shows the new design. The normal stator windings of the generator/motor have been replaced by two orthogonal sets of windings, 2 and 4. Because of their orthogonality, they are decoupled from each other electrically, though each can receive (or deliver) power flows from the rotating field produced by the Halbach array 6. In the improved design of the present invention, winding 2 will be designated as the "motor" winding, and winding 4 will be designated as the "generator" winding. FIG. 1B shows the frames 10 and 12 around which orthogonal stator windings 2 and 4 are wound. These frames appear to cross at points 14 and 16. The windings 2 and 4 can be interwound or woven together at points 14 and 16 to achieve optimum electrical decoupling. In another embodiment, one of the frames is larger than the other frame such that the larger frame and windings cross the outside of the smaller frame.

Figure 2:
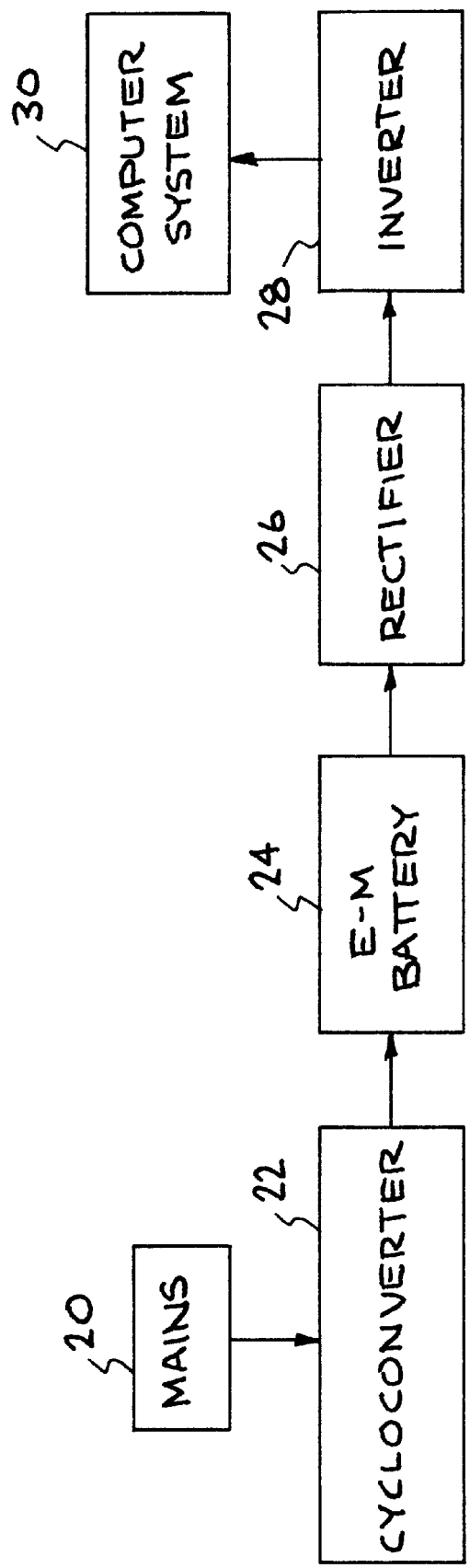
FIG. 2 shows a block diagram of a computer back-up power system.

The block diagram of FIG. 2 shows the operation of the complete system. Power from the utility mains 20 is delivered to a frequency converter 22, referred to as a cycloconverter, that converts the utility mains frequency to a variable frequency voltage synchronized to the rotation speed of the flywheel of the electromechanical battery 24. Circuitry such as that described in the afore-mentioned patent application Ser. No. 08/383,287 could be employed, for example. To start up this single-phase system the rotor could be positioned initially by a low dc current applied to the orthogonal winding 4. Following this positioning pulse, motor windings 2 would be correctly positioned to accept pulses at increasing frequency from the frequency-converter circuitry.

An example of a frequency converter would be the combination of a rectifier to convert power from the utility mains 20 to dc, followed by an inverter that converts the dc to variable-frequency alternating current. When the system is first activated, the frequency converter 22 circuitry will energize windings 2 to bring the flywheel system up to its normal operating speed, at which point it will store enough kinetic energy to operate the computer system during power failure (say 20 minutes for example). Windings 4 then will be coupled to another frequency converter system using rectifiers 26 and an inverter 28 to convert power from windings 4 to the ac frequency needed by the computer system 30. For redundancy, another E-M battery may be connected to the frequency converter, so that failure of either E-M module, or its disconnection for maintenance, would not result in power interruption.

As can be seen from the description above, owing to the orthogonal design of the stator windings and the high mechanical inertia of the flywheel rotor, the system described has the property that the power delivered to the computer system is completely insensitive to any and all electrical transients and variabilities of the power from the utility mains, including complete failure for a period determined only by the amount of stored kinetic energy in the E-M battery modules that are supplied. Furthermore there is no need whatsoever for fast-acting, fractional-cycle switches, such as are employed in conventional systems, and which are complicated to implement. The gross simplification and improvement is accomplished by the use of the orthogonal windings and by the fact that both the rotation frequency and the level of stored energy of the E-M battery rotors is completely decoupled from that delivered to the computer system through the use of a dc bus and an inverter. The use of a dc bus is however not essential. Other techniques, such as a cycloconverter to transform the E-M battery output power to the ac frequency needed by the computer system, could be used to accomplish the same end.

In addition to the use of the invention for the protection of computer systems from line transients, the invention could be applied in many other circumstances. Among these are:

Medical life-support and diagnostic equipment;

Electronic process-control equipment in factories;

Emergency power systems; and

Military and aviation electronic equipment (to protect against electrical interference from lightning or electromagnetic pulses).

Changes and modifications in the specifically described embodiments can be carried out without departing from the scope of the invention, which is intended to be limited by the scope of the appended claims.

What is claimed is:

1. An electric machine, comprising:
   a cylindrical rotor comprising an array of permanent magnets that provide a uniform dipole field;
   a stator inserted down the axis of said dipole field, said stator comprising two sets of orthogonal windings; and
   means for commutating said windings;
   wherein said rotor is on the outside of said stator.

2. An electric machine, comprising:
   a cylindrical rotor comprising an array of permanent magnets that provide a uniform dipole field; and
   a stator inserted down the axis of said dipole field, wherein said rotor is on the outside of said stator, said stator comprising a first set of windings and a second set of windings, wherein said first set of windings are orthogonal to said second set of windings, wherein said first set of windings and said second set of windings together comprise orthogonal windings, wherein said first set of windings are electrically decoupled from said second set of windings;
   means for providing power to said first set of windings, wherein power is delivered to said first set of windings to bring said rotor up to its normal operating speed, wherein said rotor will store kinetic energy.

3. The electric machine of claim 2, wherein said second set of windings are coupled to an electricity dependent system.

4. The electric machine of claim 2, wherein said means for providing power comprise means for providing a variable frequency voltage that is synchronized to the rotation speed of said rotor with respect to said first set of windings.

5. The electric machine of claim 2, wherein said first set of windings and said second set of windings each can receive power flows from said dipole field.

6. The electric machine of claim 2, wherein said cylindrical rotor comprises fiber composite, said cylindrical rotor having an inner surface that carries said array of permanent magnets.

7. The electric machine of claim 2, wherein said array of permanent magnets comprises a Halbach Array.

8. The electric machine of claim 2, wherein said orthogonal windings comprises two points of intersection, said first set of windings and said second set of windings are interwound or woven together at said two points of intersection to achieve optimum electrical decoupling.

9. The electric machine of claim 2, wherein said first set of windings is larger than said second set of windings, or vise versa, such that the larger set of windings cross the outside of the smaller set of windings.

\* \* \* \* \*